Patented Sept. 15, 1936

2,054,405

UNITED STATES PATENT OFFICE 2,054,405

WELDING CHROMIUM-NICKEL-TITANIUM STEELS

Frederick M. Becket, New York, and Russell Franks, Jackson Heights, N. Y., assignors, by mesne assignments, to Union Carbide and Carbon Corporation, a corporation of New York No Drawing. Application October 18, 1933, Serial No. 694,058

4 Claims. (Cl. 113—112)

The invention relates to welding, referring more specifically to a method of producing sound, strong, corrosion resisting welds in titanium-containing chromium-nickel steels, and to a welded joint so produced.

Austenitic chromium-nickel steels are widely used to resist the action of corrosive media. It is known that these steels tend to lose their resistance to corrosion if they are heated at certain elevated temperatures, and that they are then subject to a form of corrosive attack termed intergranular, or intercrystalline, corrosion. One method of dealing with this difficulty has been to add to the steel a suitable proportion of titanium, and metal so treated appears to resist this type of attack to a marked degree. The use of titanium has proved to be so effective that appreciable quantities of austenitic chromium-nickel steels containing this element are used commercially to advantage.

Certain difficulties are encountered in obtaining satisfactory welds in chromium-nickel steels containing sufficient titanium to improve effectively the resistance of the steel to thermal breakdown and intergranular corrosion. When a welding rod containing titanium is used in welding these chromium-nickel-titanium steels, a large proportion of the titanium present in the welding rod and in the metal immediately adjacent to the weld is lost by oxidation and the metal of the finished weld contains insufficient titanium to confer the benefits derived from introducing this element into the steel. For example, a steel containing 18.76% chromium, 8.88% nickel, 0.84% titanium, and 0.12% carbon was arc welded, using a rod of similar composition and performing the welding operation according to good practice. The deposited weld metal was analyzed and found to contain only 0.26% titanium. These difficulties are not obviated by increasing the proportion of titanium in the welding rod.

Under some conditions it is necessary to employ gas welding methods, for example the oxyacetylene method, for welding the chromium-nickel steels, and if titanium is present welding can be performed by this method only with great difficulty, because the molten metal boils constantly. The welds so obtained are unsound and contain considerable quantities of slag inclusions. As in the case of arc welding, a depletion of titanium results. All of these factors detrimentally affect both the physical properties and the corrosion resistance of the completed weld.

We have discovered that a chromium-nickel steel containing suitable amounts of columbium may be deposited by welding, using either the oxyacetylene or the arc process, without the above described difficulties encountered in the use of titanium-treated steel welding rod, and that the completed weld is sound, strong, and resistant to intergranular corrosion. Experiments have shown that the steels treated with columbium may be deposited by welding as successfully by the oxyacetylene torch as by the electric arc, and in either case an excellent recovery of the columbium is obtained in the weld. The welds obtained possess excellent corrosion resistance, thermal stability, and physical properties.

The invention is based on this discovery, and comprises, first, a method of producing sound, strong, ductile, corrosion-resisting welds in chromium steels and chromium-nickel steels, containing titanium in substantial amounts, which comprises depositing by thermal fusion metal containing chromium, nickel, and a substantial amount of columbium; and second, a welded joint so produced.

Experiments have shown that excellent welds are provided by the invention, when either gas welding or arc welding is used. For example, a steel containing 18.76% chromium, 8.88% nickel, 0.84% titanium, and 0.12% carbon was welded by the oxyacetylene process, using a welding rod containing 18.3% chromium, 8.97% nickel, 1.16% columbium, and 0.10% carbon. A sound corrosion-resisting weld resulted, and the deposited metal was found to contain 1.00% columbium, indicating that substantially all of the columbium was recovered even though the gas process was used. The decrease from 1.16% to 1.00% columbium was probably caused chiefly by dilution of the weld metal by the base metal. Similar results have been obtained by the use of the arc process. Welds made in three-sixteenths inch chromium-nickel-titanium plate, using a chromium-nickel-columbium rod applied by the oxyacetylene process and arc process, respectively, had the following tensile properties:

| | Oxyacetylene | Arc |
|---|---|---|
| Yield point, pounds per sq. in | 41,100 | 49,400 |
| Maximum stress, pounds per sq. in | 75,500 | 81,200 |
| Percent elongation in 2 inches | 18 | 22 |

It will be observed that the welds obtained according to the invention are ductile and strong when produced by either gas or arc welding. Welds so produced have been boiled in concentrated nitric acid, and it was found that they withstood this treatment to a satisfactory degree, indicating a superior corrosion resistance.

The excellent results of the invention are not obtainable unless sufficient columbium is present in the welding rod and the completed weld. The columbium content of the finished weld should preferably be at least about four times the carbon content although a lesser proportion of columbium may produce useful results under some conditions. To secure optimum results in cases where the welded joint will be held for long periods of time at elevated temperatures in a corrosive medium, the columbium content should be about ten times the carbon content. Caution must be exercised in using the oxyacetylene method to avoid excessive carbon absorption in the weld and, in general, it is recommended that rods containing somewhat more columbium be employed when the welding is done by this method than when it is done with an arc.

The invention is applicable to steels containing about 3% to 30% chromium, about 5% to 35% nickel, and a titanium content at least twice the carbon content. The carbon content is preferably not more than about 0.3%. The titanium content of the base metal, and the columbium content of the weld filler material, need not exceed 5% each under most conditions. While the invention is directed chiefly to welding chromium-nickel-titanium steels, it may also be used, of course, in the welding of chromium-titanium steels.

The weld filler material need not contain the same percentages of chromium, nickel, or carbon as the base material adjacent to the filler.

It is realized that under some circumstances the rods used for welding must be coated with certain fluxes to facilitate welding or flux must otherwise be used to assist in the welding operation. The use of such fluxes is included within the invention.

We claim:

1. Method of producing sound, strong, ductile, corrosion-resisting welds in steels containing about 3% to 30% chromium, about 5% to 35% nickel, carbon in amounts up to about 0.3%, and at least twice the carbon content but not over 10% titanium, which comprises depositing on the steel by thermal fusion metal containing about 3% to 30% chromium, about 5% to 35% nickel, carbon in an amount up to about 0.3%, and at least about four times the carbon content but not over 5% columbium.

2. Method of producing sound, strong, ductile, corrosion-resisting welds in steels containing about 3% to 30% chromium, about 5% to 35% nickel, carbon in amounts up to about 0.3%, and at least twice the carbon content but not over 5% titanium, which comprises depositing on the steel by thermal fusion metal containing about 3% to 30% chromium, about 5% to 35% nickel, carbon in an amount up to about 0.3%, and at least about ten times the carbon content but not over 5% columbium.

3. A welded joint comprising at least two adjacent pieces of steel containing about 3% to 30% chromium, about 5% to 35% nickel, carbon in amounts up to about 0.3%, and at least twice the carbon content but not over 5% titanium; and filler material joining the said pieces, the filler material being a steel containing about 3% to 30% chromium, about 5% to 35% nickel, carbon in an amount up to about 0.3%, and at least about four times the carbon content but not over 5% columbium.

4. A welded joint comprising at least two adjacent pieces of steel containing about 3% to 30% chromium, about 5% to 35% nickel, carbon in amounts up to about 0.3%, and at least twice the carbon content but not over 5% titanium; and filler material joining the said pieces, the filler material being a steel containing about 3% to 30% chromium, about 5% to 35% nickel, carbon in an amount up to about 0.3%, and at least about ten times the carbon content but not over 5% columbium.

FREDERICK M. BECKET.
RUSSELL FRANKS.